US012204463B2

(12) United States Patent
Katragada et al.

(10) Patent No.: US 12,204,463 B2
(45) Date of Patent: Jan. 21, 2025

(54) INTEGRATION OF DISPARATE SYSTEM ARCHITECTURES USING CONFIGURABLE ISOLATED MEMORY REGIONS AND TRUST DOMAIN CONVERSION BRIDGE

(71) Applicant: Intel Corporation, Santa Clara, CA (US)

(72) Inventors: Aditya Katragada, Austin, TX (US); Peter Munguia, Chandler, AZ (US); Gregg Lahti, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 17/699,320

(22) Filed: Mar. 21, 2022

(65) Prior Publication Data

US 2022/0283959 A1 Sep. 8, 2022

Related U.S. Application Data

(62) Division of application No. 15/990,720, filed on May 28, 2018, now Pat. No. 11,281,595.

(51) Int. Cl.
*G06F 12/14* (2006.01)
*G06F 13/40* (2006.01)
(Continued)

(52) U.S. Cl.
CPC ...... *G06F 12/1491* (2013.01); *G06F 12/1441* (2013.01); *G06F 13/4018* (2013.01); *G06F 21/6236* (2013.01); *G06F 21/79* (2013.01)

(58) Field of Classification Search
CPC ............. G06F 12/1491; G06F 12/1441; G06F 13/4018; G06F 21/6236; G06F 21/79
(Continued)

(56) References Cited

U.S. PATENT DOCUMENTS 9,852,084 B1  12/2017  Soderquist et al.
2007/0067549 A1  3/2007  Gehman
(Continued)

FOREIGN PATENT DOCUMENTS

CN  103973451 A  *  8/2014
JP  2010514028 A  *  4/2010  ............... G06F 9/46
WO  WO-2008099420 A2  *  8/2008  ............. G06Q 20/02

OTHER PUBLICATIONS

Siddiqui et al., "Pro-Active Policing and Policy Enforcement Architecture for Securing MPSoCs," 2018 31st IEEE International System-on-Chip Conference (SOCC), Arlington, VA, USA, 2018, pp. 140-145, doi: 10.1109/SOCC.2018.8618531. (Year: 2018).*
(Continued)

*Primary Examiner* — Peter C Shaw
(74) *Attorney, Agent, or Firm* — Alliance IP, LLC

(57) ABSTRACT

Techniques are described for providing consistent memory operations and security across electronic circuitry components having disparate memory and/or security architectures when integrating such disparately architected components within a single system, such as a system on chip. A programmable logical hierarchy of isolated memory region (IMR) enforcement circuits is provided to protect such IMRs, allowing or preventing memory access requests from one of multiple distinct circuitry components based on configuration registers for the IMR enforcement circuits. Integration of multiple trust domain architectures associated with the multiple distinct circuitry components is facilitated via trust domain conversion bridge circuitry that includes translation logic for generating information in accordance with a first trust domain architecture based on information provided in accordance with a distinct second trust domain architecture.

25 Claims, 5 Drawing Sheets

(51) Int. Cl.
  *G06F 21/62* (2013.01)
  *G06F 21/79* (2013.01)
(58) Field of Classification Search
  USPC .......................................................... 726/34
  See application file for complete search history.

(56) References Cited

U.S. PATENT DOCUMENTS

| | | | | |
|---|---|---|---|---|
| 2008/0072277 | A1* | 3/2008 | Cohen | H04L 67/34 726/1 |
| 2008/0072278 | A1* | 3/2008 | Cohen | H04L 67/34 726/1 |
| 2009/0320103 | A1* | 12/2009 | Veeraraghavan | G06F 21/335 726/4 |
| 2012/0079590 | A1* | 3/2012 | Sastry | G06F 12/1458 726/21 |
| 2013/0086287 | A1 | 4/2013 | Fleming et al. | |
| 2014/0137231 | A1* | 5/2014 | Sastry | G06F 21/76 726/16 |
| 2014/0189187 | A1 | 7/2014 | Acharya et al. | |
| 2014/0201435 | A1* | 7/2014 | Dong | G06F 13/1694 711/158 |
| 2014/0250253 | A1* | 9/2014 | Luo | G06F 13/404 710/313 |
| 2014/0282819 | A1* | 9/2014 | Sastry | G06F 21/57 726/1 |
| 2015/0032996 | A1 | 1/2015 | Koeberl et al. | |
| 2015/0089173 | A1 | 3/2015 | Chhabra et al. | |
| 2015/0286584 | A1 | 10/2015 | Humphries et al. | |
| 2016/0119289 | A1* | 4/2016 | Jain | H04L 69/08 726/12 |
| 2017/0185550 | A1* | 6/2017 | Chellappan | G06F 1/26 |

OTHER PUBLICATIONS

Ray et al., "Security policy enforcement in modern SoC designs," 2015 IEEE/ACM International Conference on Computer-Aided Design (ICCAD), Austin, TX, USA, 2015, pp. 345-350, doi: 10.1109/ICCAD.2015.7372590. (Year: 2015).*

Farzana et al., "SoC Security Verification using Property Checking," 2019 IEEE International Test Conference (ITC), Washington, DC, USA, 2019, pp. 1-10, doi: 10.1109/ITC44170.2019.9000170. (Year: 2019).*

Zhou et al., "A Formal Verification Method for the SOPC Software," in IEEE Transactions on Reliability, vol. 71, No. 2, pp. 818-829, Jun. 2022, doi: 10.1109/TR.2022.3166548. (Year: 2022).*

Kwak et al., "Trust domain based trustworthy networking," 2017 International Conference on Information and Communication Technology Convergence (ICTC), Jeju, Korea (South), 2017, pp. 1247-1259, doi: 10.1109/ICTC.2017.8190911. (Year: 2017).*

Zhang et al., "The Research of Cross-Domain Usage Control Model in Web Services," 2010 2nd International Conference on E-business and Information System Security, Wuhan, China, 2010, pp. 1-5, doi: 10.1109/EBISS.2010.5473593. (Year: 2010).*

Ma et al., "Leveraging Transitive Trust Relations to Improve Cross-Domain Recommendation," in IEEE Access, vol. 6, pp. 38012-38025, 2018, doi: 10.1109/ACCESS.2018.2850706. (Year: 2018).*

Liu et al., "A New Model for Authentication and Authorization across Heterogeneous Trust-Domain," 2008 International Conference on Computer Science and Software Engineering, Wuhan, China, 2008, pp. 789-792, doi: 10.1109/CSSE.2008.1152. (Year: 2008).*

Mckeen, Frank; et. al.; "Innovative Instructions and Software Model for Isolated Execution;" Aug. 14, 2013; Intel.com; available at: https ://software. i ntel. com/content/www /us/en/develop/articles/innovative instructions-and-software-model-for-isolated-execution .html (Year: 2013).

Meng, Dan et. al.; "Security-first architecture: deploying physically isolated active security processors for safeguarding the future of computing;" Jun. 5, 2018; SpringerOpen: Cybersecurity; available at: https://cybersecurity.springeropen.com/articles/10.1186/s42400-018-0001-z (Year: 2018).

Ruhalkde; "ARM—Confused Over Memmory Mapping;" Jul. 13, 2011; StackOverflow.com; available at: https://stackoverflow.com/questions/6648873/confused-over-memory-mapping (Year: 2011).

* cited by examiner

INTEGRATION OF DISPARATE SYSTEM ARCHITECTURES USING CONFIGURABLE ISOLATED MEMORY REGIONS AND TRUST DOMAIN CONVERSION BRIDGE

CROSS-REFERENCE TO RELATED APPLICATION

This application is a division of U.S. patent application Ser. No. 15/990,720 filed May 28, 2018, entitled "INTEGRATION OF DISPARATE SYSTEM ARCHITECTURES USING CONFIGURABLE ISOLATED MEMORY REGIONS AND TRUST DOMAIN CONVERSION BRIDGE." The disclosure of the prior application is considered part of and is hereby incorporated by reference in its entirety in the disclosure of this application.

TECHNICAL FIELD

The present disclosure relates to integrating disparate components having disparate architectures, and more particularly, to incorporating multiple such disparate components into a single host circuitry system.

BACKGROUND

Advancements in semiconductor technology have enabled functional components of a computer or electronic system to be integrated and designed as a system-on-a-chip (SoC) device. In an SoC device, components traditionally manufactured as separate chips such as microprocessors, microcontrollers, data converters, signal processors, memory, and various interfaces, for example, may be embedded into a standalone system on a single chip. The functional units of the SoC device may be designed to communicate internally with each other over an on-chip bus, as well as to communicate with one or more external or off-chip components, such as an off-chip dynamic random access memory (DRAM). Exemplary SoC devices may be programmed to perform one or more networking, multimedia, and/or communications applications for personal a computer (PC), consumer electronics (CE), and/or mobile platform.

In various circumstances, it may be advantageous to integrate multiple standalone circuitry components, including multiple SoCs, into a single larger SoC or other system (e.g., using stacked-die or other approaches). However, disparate circuitry components, especially those from different suppliers and/or different designers, are often designed in accordance with disparate system architectures. For example, circuitry components provided by a first supplier may be intended for use within a system that is assumed to possess a known trust domain architecture, such as to ensure hardware-level protection for secure operations and/or data. Other circuitry components provided by a distinct second supplier may be intended for use within a system that is assumed to possess a distinct other trust domain architecture. Similarly, circuitry components provided by one supplier may be intended for use within systems having a flexible memory map, such as may include target-based protections for memory I/O operations; circuitry components provided by another supplier may be intended for use within systems having a fixed memory map.

When integrating disparate circuitry components into a single system, such as an SoC, various complications may arise from such disparate circuitry components having (or having been developed based on) separate security and/or memory architectures. For example, it may be desirable during the development of an integrated system to utilize one set of components based on a first trust domain architecture as well as another set of components based on a distinct second trust domain architecture. As another example, it may be desirable to utilize one set of components expecting a flexible memory map with target-based protections for memory or memory-mapped I/O, and another set of components expecting a fixed memory-map-based security model for memory-based protection.

Without an ability to integrate prebuilt SoCs and other standalone circuitry components having disparate memory architectures and/or security architectures, the use and reuse of such components when building larger SoCs may be severely constrained. Thus, solutions are needed to incorporate such disparately architected components into single integrated systems, while preserving the integrity of such components and limiting the additional development and manufacturing costs for such integrated systems.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
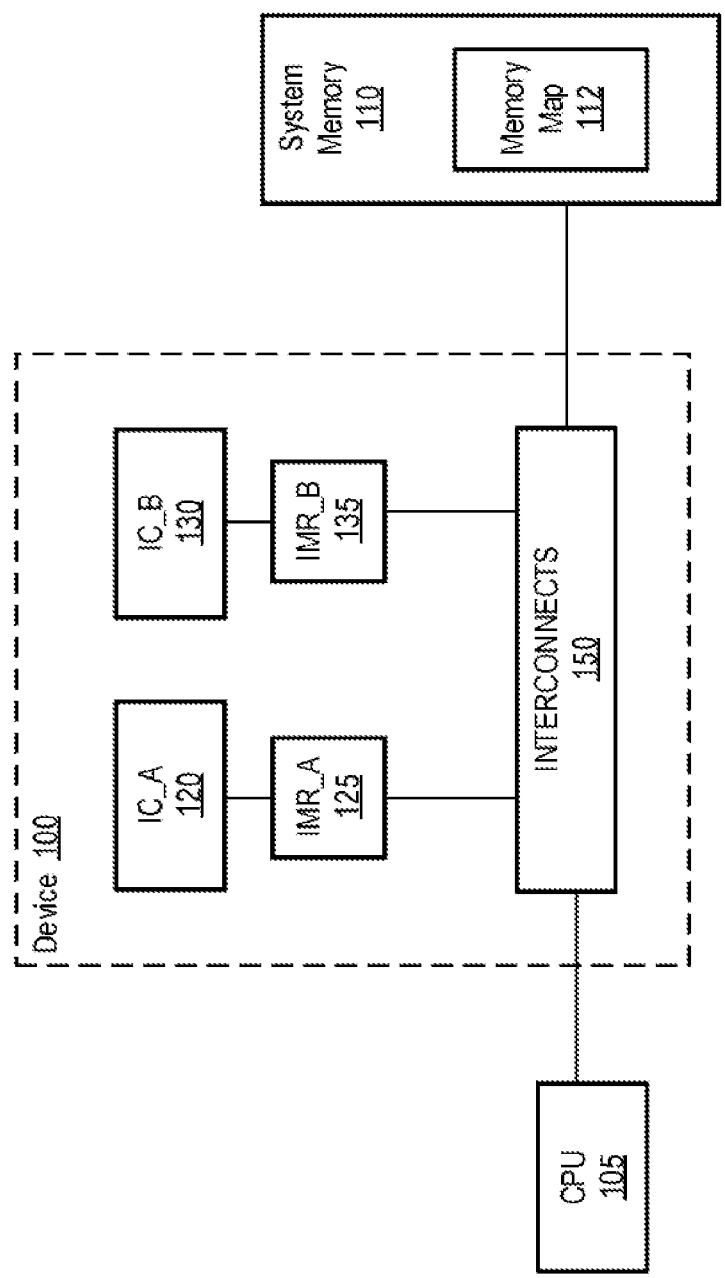
FIG. 1 depicts an exemplary integrated device that incorporates multiple disparately architected circuitry components in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

In the description herein, numerous specific details are set forth, such as may include examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

The present disclosure is directed to techniques for providing consistent memory operations and security across electronic circuitry components having disparate memory and/or security architectures when integrating such disparately architected components within a single system, such as a system on chip (SoC).

Such techniques may include, for example, implementing memory protection for one or more circuitry components at one or more externally facing interfaces using a finite, dynamically programmable, access controlled isolated memory region (IMR) for such circuitry components in order to define a programmable memory protection model without needing to redesign either the host SoC or the circuitry components themselves. This enables the host SoC to implement an overall access control model by configuring memory address ranges and permission levels for each implemented IMR dynamically at runtime—and notably, after the circuitry component is integrated—without breaking the security requirements of any individual component. This approach also provides an expandable logical access control mechanism when building complex SoCs, such as when implementing stacked die or multi-die configurations using prebuilt SoCs or other circuitry components. Thus, consistent with the present disclosure and in order to ensure the integrity and protection of memory access for such components, one or more of the described isolated memory regions (IMRs) may be provided to handle finite addressable memory access by each of one or more distinct circuitry components.

Additionally, in order to preserve the trusted computing base (TCB) of integrated host SoCs that include multiple such circuitry components, such techniques may further include providing one or more trust domain conversion bridges (TDCB) for losslessly handling security-defining attributes across disparate trust domain architectures associated with those components. Thus, the techniques described herein enable merging disparate trust domain architectures having different trust-defining attributes in order to meet a single, system-wide trust domain definition without requiring a redesign of the particular circuitry components in order to satisfy the requirements of such disparate trust domain ecosystems. Various examples of such trust domain architectures include TET (Trusted Execution Technology), SAI (Security Attributes Initiator), and SGX (Software Guard Extensions) from the Intel Corporation; TrustZone from the ARM Corporation; PSP (Platform Security Processor) and/or AMD Secure Execution Environment from the Advanced Micro Devices Corporation, and others.

It will be appreciated that in various embodiments and circumstances, a single SOC or other integrated system may employ one or more IMR enforcement circuits (such as to enable the dynamic configuration of memory address ranges and permission levels for each of multiple IMRs) as well as one or more TDCBs (such as to effectively merge disparate trust domain architectures) in order to effectively manage the integration of both disparate memory architectures and disparate trust domain architectures within that single integrated system.

As used herein, the term "IC" may refer to an integrated circuit, SoC, or other circuitry component, and may in various embodiments be further integrated to one or more additional such components and/or larger devices. It will be appreciated that any device, SoC, or IC referred to herein may comprise one or more additional ICs or other subcomponents, and that such additional ICs or other subcomponents may not be separately depicted and/or referenced herein for purposes of clarity. Also as used herein, the term "memory access" may generally describe (unless context clearly indicates otherwise) access to one or more memory locations, including access to memory systems (e.g., SRAM and/or DRAM) as well as memory mapped access with respect to one or more I/O channels and/or one or more peripheral devices.

FIG. 1 depicts an exemplary device 100, such as an SoC or other component, coupled to a central processing unit (CPU) 105 and to a system memory 110, which includes a memory map 112. It will be appreciated that in various embodiments, one or both of CPU 105 and system memory 110 may be included with in the device 100. Incorporated within the device 100 are two integrated circuitry components IC_A 120 and IC_B 130, each based on a distinct memory protection architecture. For purposes of this exemplary system, IC_A 120 will be assumed to be based on an IOSF architecture, and therefore utilize a flexible memory map with target-based protections; IC_B 130 will be assumed to be based on an ARM ecosystem, such that it expects to utilize an external fixed memory map. In various embodiments, and as exemplified herein with respect to FIG. 3, a system integrating a plurality of ICs may utilize multiple ICs that are based on an identical memory protection architecture or other design, as well as one or more additional ICs based on a distinct other memory protection architecture.

In various embodiments and circumstances, different ICs may expect and/or require a particular memory protection model associated with that circuitry component in order to be integrated within a larger host system. For example, circuitry components designed based on Intel's IOSF (Intel's I/O Scalable Fabric) typically expect a fully flexible memory map with target-based protections for memory or memory-mapped I/O. In contrast, circuitry components designed for ARM-based ecosystems typically expect to utilize a fixed memory map security model for memory-based protection.

In the depicted embodiment of FIG. 1, each of the incorporated ICs (IC_A 120 and IC_B 130) is coupled to the CPU 105 and system memory 110 via a respective isolated memory region (IMR) and via interconnects 150, which in various embodiments may comprise memory fabric, I/O fabric, or other interconnect fabrics suitable for interfacing between an IC and the larger host device. In the illustrated embodiment, IC_A 120 is logically coupled to IMR_A 125; IC_B 130 is logically coupled to IMR_B 135. Each IMR is provided as a hardware enforcement mechanism to create extendable and dynamic memory access control, and may be configured via one or more configuration registers to satisfy the respective memory protection needs of one or more associated ICs regardless of the underlying memory protection architecture expected by those associated ICs. In this manner, such IMRs may be configured at the time of system initialization to protect destination memory access targets and address ranges without needing to redesign the associated ICs in order for those associated ICs to be incorporated within the larger host system.

In various embodiments, the protection afforded by each IMR may be provided at every external facing interface of an IC; at each external interface of a plurality of ICs that each share an underlying memory protection architecture; or at interfaces that may require expansion of an associated memory map in the future. Thus, in the depicted embodiment, a single finite region of system memory 310 is dedicated to a subsystem of ICs via memory map 312, such that an access control layer for each of IC_A 120 and IC_B 130 is added to device 100 via a corresponding IMR. As is described elsewhere herein in greater detail, subregions of each respective IMR may be allocated to each of the ICs 120 and 130 in accordance with the memory protection model respectively expected by those ICs. In this manner, a host SoC device incorporating ICs designed for a flexible memory map and ICs designed for a fixed memory map may satisfy design expectations for both types of ICs without employing extensive redesign of the SoC device that might otherwise be required.

Figure 2:
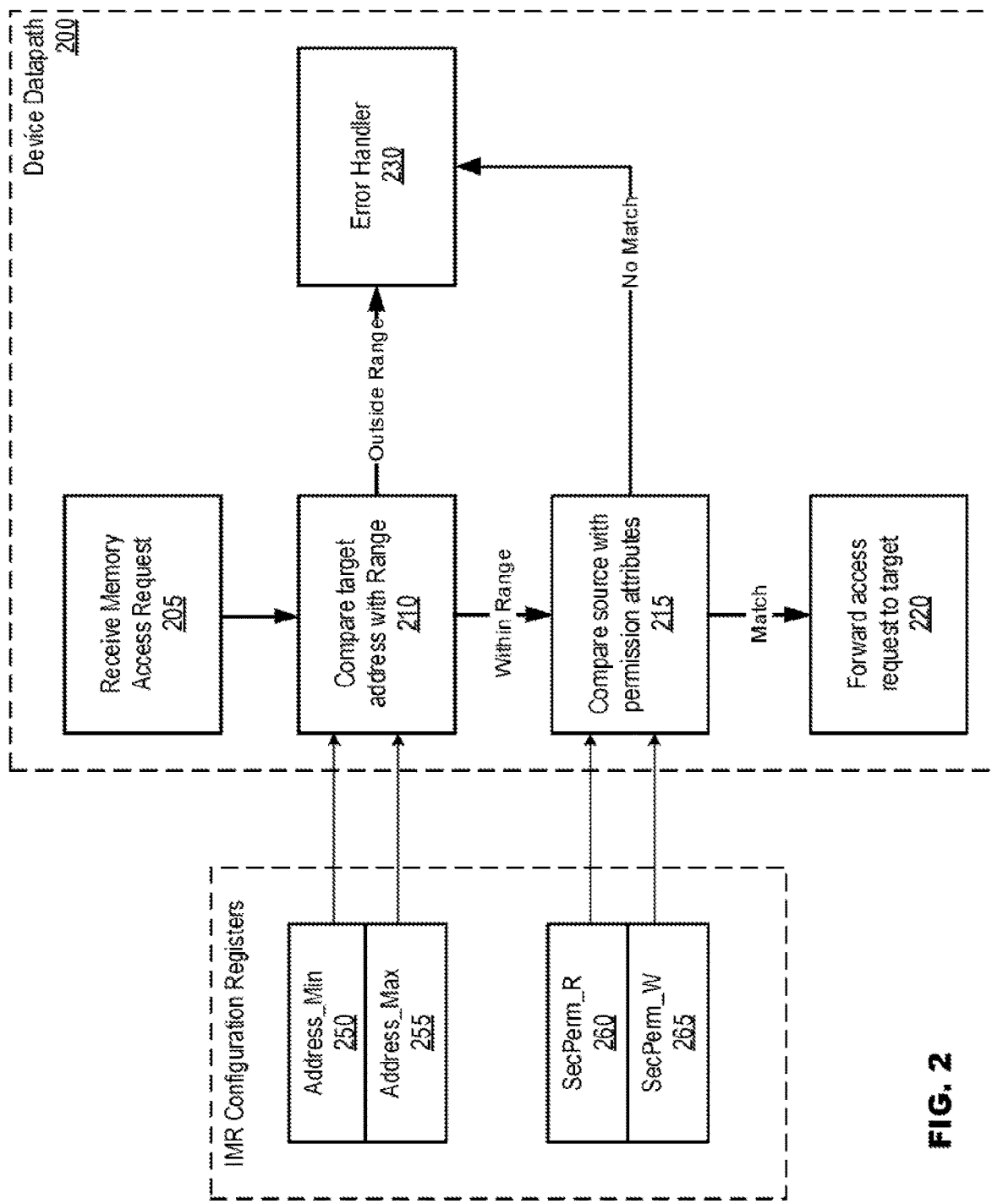
FIG. 2 depicts an exemplary logical representation of operations performed in accordance with techniques presented herein, such as may be performed by an integrated device incorporating multiple disparately architected circuitry components.

FIG. 2 depicts a logical representation of exemplary operations performed in an embodiment employing independent memory regions as described herein, such as the IMRs 125 and 135 depicted within FIG. 1. A device data path 200, which may be considered as memory cycles executing via an unspecified inter-connective memory fabric, exemplifies such operations initiated via a memory access request from a source IC. Also depicted are IMR configuration registers associated with an exemplary independent memory region. As noted elsewhere herein, the source of the memory access request is identified by a unique system ID. In certain embodiments, such ID is immutable and hardware-locked, such that the ID may not be modified or "spoofed" (i.e., emulated); in other embodiments, the ID may be statically or dynamically assigned, such as via device enumeration.

At operation 205, the memory access request is received, with the memory access request being associated with a target memory address and the ID of the source IC. At operation 210, the target memory address is compared with a configurable memory address range identified via the Address_Min and Address_Max addresses stored respectively in IMR configuration registers 250 and 255. It will be appreciated that in various embodiments, one or more IMRs utilized within a system may include additional or fewer such IMR configuration registers, such as may be needed to identify multiple configurable memory address ranges associated with and protected by the IMR.

Continuing the example of FIG. 2, if the target memory address specified by the received memory access request is within the memory address range identified via configuration registers 250 and 255, operations continue to operation 215. In operation 215, the source ID associated with the memory access request is compared with permission attributes specified via IMR permission configuration registers 260 (SecPerm_R, indicating one or more source IDs that are allowed to or prevented from reading the contents of memory locations associated with the IMR) and 265 (SecPerm_W, indicating one or more source IDs that are allowed to or prevented from writing to such memory locations). If the comparison performed in operation 215 indicates that the source ID associated with the memory access request has the appropriate permissions, operations continue to operation 220, in which the IMR forwards the memory access request to the target. It will again be appreciated that in various embodiments, additional IMR permission configuration registers may be utilized in accordance with the techniques presented herein, such as to configure a plurality of permission levels as needed.

If in operation 210 it is determined that the target memory address is not within the appropriate memory address range specified via the IMR address configuration registers 250 and 255, or if in operation 215 it is determined that the source ID associated with the memory access request is not permitted to perform the requested access, the operation is disallowed and forwarded to error handler 230. In this manner, when target memory addresses are within the appropriate range and match security checks for that address range, cycles are allowed to proceed; non-matching cycles are dropped and error-responded when the target address is out of range or if the security attributes fail to match. As will be appreciated, utilizing IMR's to filter outgoing memory cycles from one or more associated ICs allows the IC to enforce access control for its memory protection in a manner consistent with the architecture expected by that IC. As indicated elsewhere herein, at runtime a software programming flow (such as may be accomplished via the system OS or BIOS) enables programming of each IMR's configuration registers, thereby establishing each IC's protection in accordance with its respective requirements.

Figure 3:
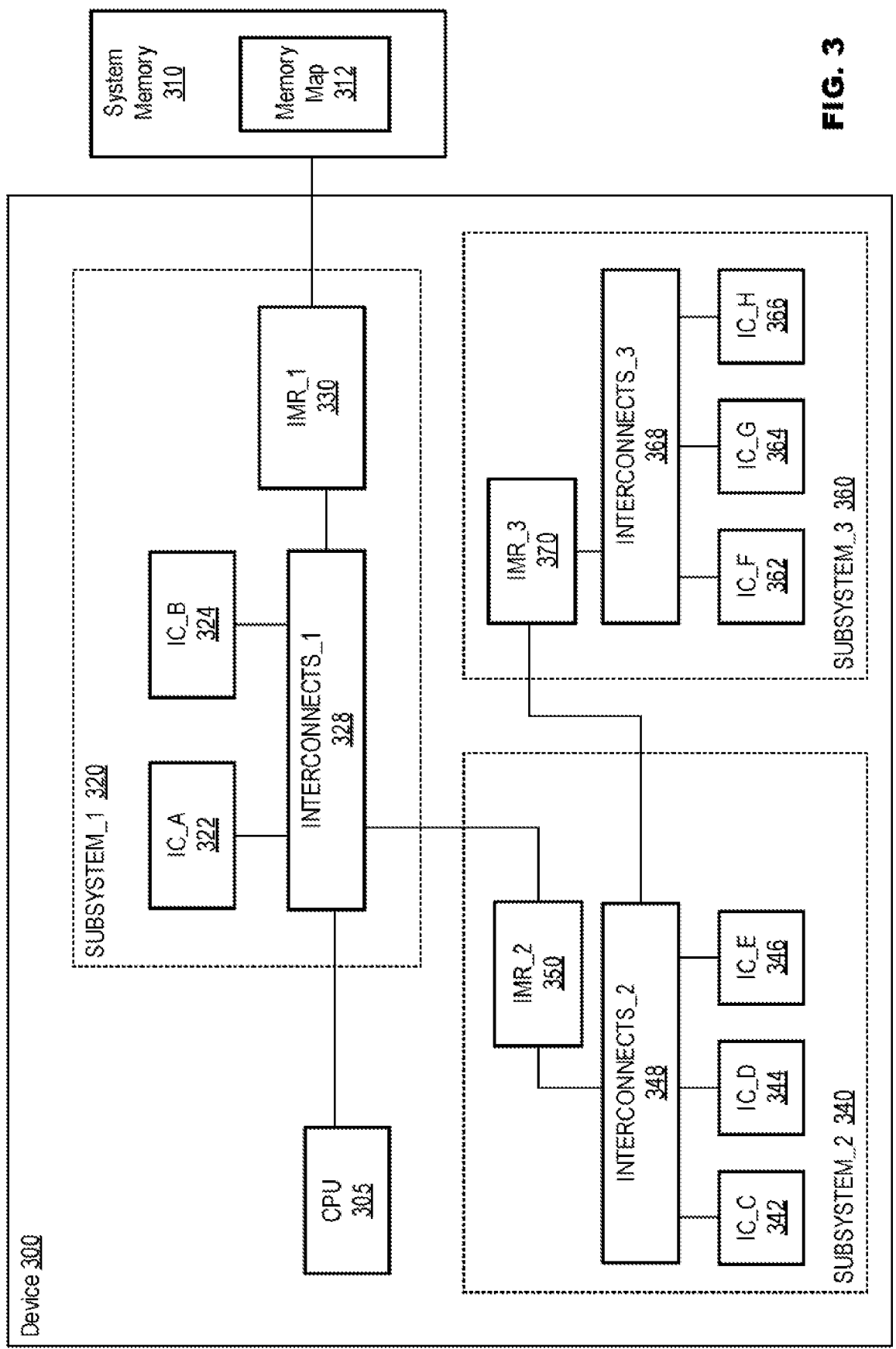
FIGS. 3-4 depict exemplary integrated devices that each incorporate multiple disparately architected circuitry components in accordance with embodiments of the present disclosure.

FIG. 3 depicts an additional exemplary integrated device 300, such as an SoC or other device, in accordance with techniques described herein. The device 300 includes a CPU 305 and three IC subsystems, respectively identified as SUBSYSTEM_1, SUBSYSTEM_2, and SUBSYSTEM_3. The device 300 is coupled to a system memory 310 that includes a memory map 312. It will be appreciated that in various embodiments, the device 300 may include additional components that are not shown for purposes of clarity, and/or in certain embodiments may further incorporate system memory 310.

In the depicted embodiment of FIG. 3, SUBSYSTEM_1 320 includes circuitry components IC_A 322 and IC_B 324, both of which are coupled to an isolated memory region 330 (IMR_1) via fabric 328 (INTERCONNECTS_1). Similarly, SUBSYSTEM_2 340 includes circuitry components IC_C 342, IC_D 344, and IC_E 346, all of which are coupled to isolated memory region 350 (IMR_2) via fabric 348 (INTERCONNECTS_2); SUBSYSTEM_3 360 includes circuitry components IC_F 362, IC_G 364, and IC_H 366, all of which are coupled to an isolated memory region 370 (IMR_3) via fabric 368 (INTERCONNECTS_3).

In at least some embodiments, configuration register values effectuating a configuration of multiple IMRs may be assigned during device power up, device enumeration, or other boot operations, such as prior to control being passed to an operating system of the device 300. In the depicted embodiment, a single finite region of system memory 310 is dedicated to the three subsystems of ICs, such that an access control layer is added in the data path associated with each of the three subsystems via a corresponding IMR. Subregions may be configured based on one or more memory address ranges and permission levels specified via configuration registers (not separately depicted), and allocated to each of the underlying ICs in accordance with the memory protection model respectively expected by those ICs. In addition, an advantage to the configurability of such IMRs includes the ability to present multiple expected segments of isolated memory to each of one or more ICs while utilizing fewer actual portions of segmented isolated memory. In this manner, multiple regions of isolated memory may be emulated for purposes of satisfying any criteria for which such ICs are originally designed.

The following tables present an exemplary configuration for the device 300 of FIG. 3.

| IMR_1 330 | Configuration | Comments |
| --- | --- | --- |
| Isolated Region 1.1 | Assigned to IC_A firmware | Mask configuration enables only IC_A firmware traffic to this address region |

-continued

| IMR_1 330 | Configuration | Comments |
|---|---|---|
| Isolated Region 1.2 | Assigned to IC_A data | Mask configuration enables only IC_A data traffic to this address region |
| Isolated Region 1.3 | unassigned | |
| Isolated Region 1.4 | Assigned to IC_B & IC_C shared data | Mask configuration enables only IC_B & IC_C data traffic to this address region |
| Isolated Region 1.5 | unassigned | |
| Isolated Region 1.6 | Assigned to IC_D & IC_E shared data | Mask configuration enables only IC_D & IC_E shared data traffic to this address region |
| . . . | . . . | |
| Isolated Region 1.x | Assigned to Region N Level (N.1-x(N.M.1-y], . . . ) | Can be configured to provide N regions per IMR (configured at design time in certain embodiments), each of which can support one or more hierarchy levels below them (such as for future expansion) |

Notably, the configuration of each IMR may allow memory access traffic to and from ICs that are external to the individual subsystem associated with that IMR. For example, as indicated above, isolated region 1.4 enables data traffic from both IC_B (which is within SUBSYSTEM_1) and IC_C (which is within SUBSYSTEM_2). In a similar manner, the configuration of isolated region 1.6 of IMR_1 enables shared data access from IC_D or IC_E, neither of which are included within the SUBSYSTEM_1 that includes IMR_1.

| IMR_2 350 | Configuration | Comments |
|---|---|---|
| Isolated Region 2.1 | Assigned to IC_D firmware | Mask configuration enables only IC_D firmware traffic to this address region |
| Isolated Region 2.2 | Assigned to IC_D data | Mask configuration enables only IC_D data traffic to this address region |
| Isolated Region 2.3 | unassigned | |
| Isolated Region 2.4 | Assigned to IC_E & IC_F shared data | Mask configuration enables only IC_E & IC_F shared data traffic to this address region |
| Isolated Region 2.5 | unassigned | |
| Isolated Region 2.6 | Assigned to Region 6F Level 3 (IMR 3.6F) | Mask configuration enables only IMR1.6.6F traffic to this address region |
| Isolated Region 2.x | Assigned to Region N Level (N.1-x(N.M.1-y], . . . ) | Can be configured to provide N regions per IMR (configured at design time in certain embodiments), each of which can support one or more hierarchy levels below them (such as for future expansion) |

| IMR_3 370 | Configuration | Comments |
|---|---|---|
| Isolated Region 3.1 | Assigned to IC_G firmware | Mask configuration enables only IC_G firmware traffic to this address region |
| Isolated Region 3.2 | Assigned to IC_H data | Mask configuration enables only IC_H data traffic to this address region |

Figure 4:
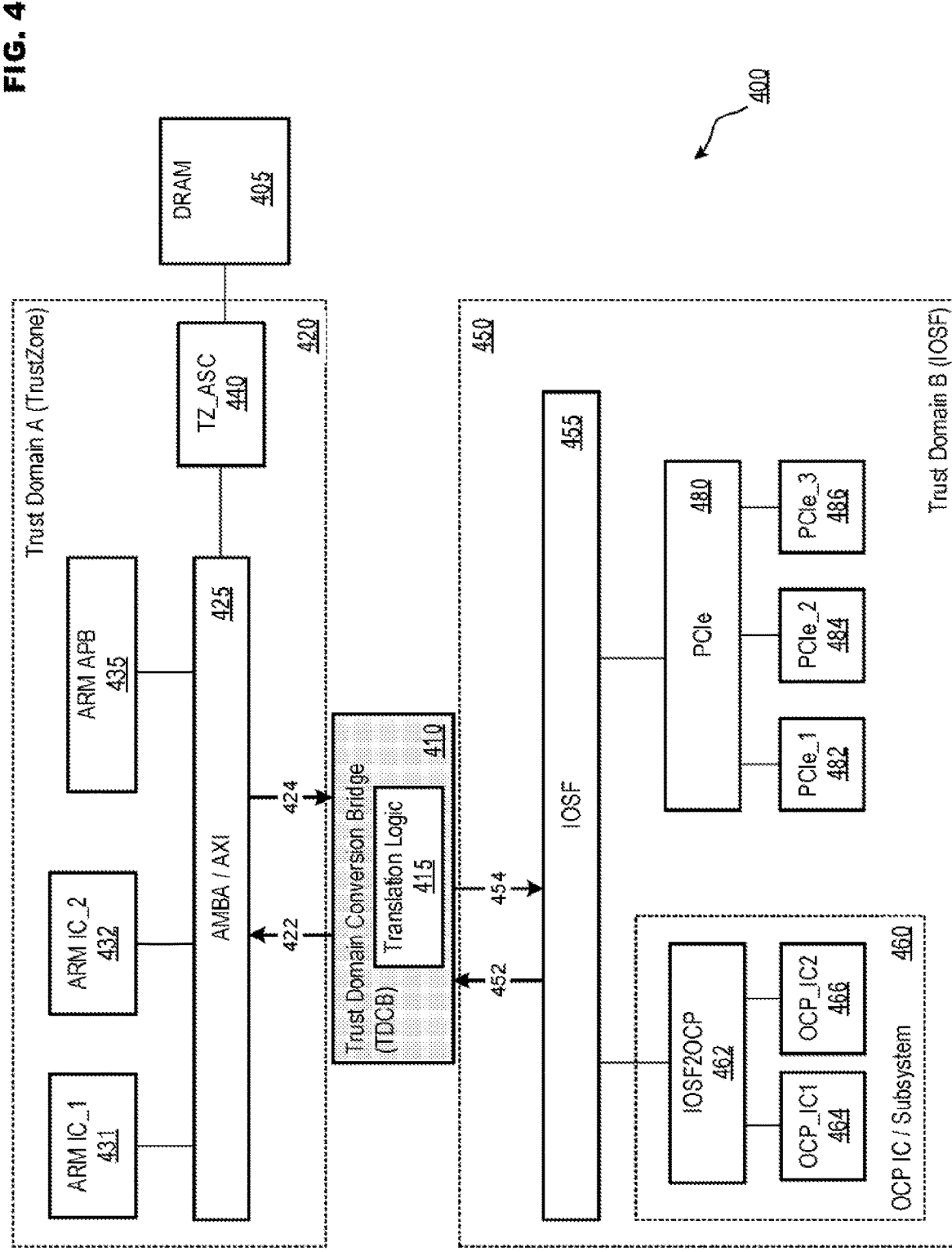

FIG. 4 depicts particular elements of an exemplary integrated device 400 illustrating additional techniques for incorporating multiple disparately architected circuitry components, such as those designed for distinct and separate trust domain architectures. Such techniques may be used independently of or in conjunction with those discussed elsewhere herein, such as those described with respect to FIGS. 1-3.

In the depicted embodiment, a trust domain conversion bridge (TDCB) 410 that includes translation logic 415 is provided in order to provide lossless translation of data between and in accordance with circuitry components having distinct trust domain architectures. In particular, a first Trust Domain 420 includes a variety of ICs and other circuitry components using a TrustZone security model designed for use with the Advanced Microcontroller Bus Architecture (AMBA) and/or Advanced eXtensible Interface (AXI) bus architectures associated with the ARM Corporation; a second Trust Domain 450 includes a variety of ICs and other circuitry components that are designed for use with the I/O Scalable Fabric (IOSF) bus architecture provided by and associated with the Intel Corporation, such as may utilize one or more Security Attributes Initiators (SAIs) and/or other aspects of an IOSF-compatible security model. It will be appreciated that in various embodiments and circumstances, the provided TDCB may be configured and utilized with respect to additional trust domains and security models, either in addition to or in lieu of those used as examples herein.

The TDCB 410 generally translates (via translation logic 415) information specific to and received from trust domain 420 to information suitable for trust domain 450, and vice versa. In particular, incoming ports of the TDCB 410 coalesce the different types of signals and information that define a specific trusted state per transaction; the TDCB 410 utilizes translation logic 415 to convert and output them to a substantially equivalent set of signals and information in the alternate trust domain. In certain embodiments, the TDCB translation logic 415 may comprise one or more of a finite state flow, a fixed or programmable translation table, and equivalent logical structures capable of interpreting incoming security rights and attributes and re-creating corresponding outgoing security rights and attributes. The TDCB 410 and corresponding translation logic 415 may further include configurable parameters to provide and compensate for one or more additional relevant machine states that may not be specific to each Trust Domain. For example, the TDCB 410 may include configurable options to compensate for machine states corresponding to one or more of a debug state, pre-boot state, boot state, and an OS-specified state.

In the depicted embodiment, the TDCB 410 is communicatively coupled to AMBA/AXI bus 425 via outgoing logical data path 422 and incoming logical data path 424. In turn, the AMBA/AXI bus 425 is communicatively coupled to a pair of ARM-based ICs 431 ("ARM IC_1") and 432 ("ARM IC_2"); an ARM-based Advanced Peripheral Bus (APB) 435; and a TrustZone Address Space Controller ("TZ_ASC") 440, through which the AMBA/AXI bus 425 is also coupled to system DRAM 405. All of these components depicted as logically within Trust Domain 420 are designed for and utilize security information specific to a TrustZone security model and corresponding architecture. It will be appreciated that, for the sake of clarity, additional ARM-based components may be present within both the device 400 and trust domain 420, but not separately depicted within the context of FIG. 4. A non-exclusive list of such additional components may include, for example, one or more ARM-based System Memory Management Units.

Also in the depicted embodiment, TDCB 410 is further communicatively coupled to IOSF bus 455 via incoming logical data path 452 and outgoing logical data path 454. In turn, the IOSF bus 455 is communicatively coupled to an Open Core Protocol ("OCP") subsystem 460 and a Peripheral Component Interconnect Express ("PCI Express" or "PCIe") peripheral bus 480. The OCP subsystem 460 includes an IOSF2OCP bridge that comprises connective fabric between the IOSF bus 455 and two OCP-based ICs 464 ("OCP_IC1") and 466 ("OCP_IC2"). The PCIe peripheral bus 480 is separately and communicatively coupled to three distinct PCIe-based ICs and/or peripherals 482 ("PCIe_1"), 484 ("PCIe_2") and 486 ("PCIe_3"). In a manner similar to that described above with respect to trust domain 420, it will be appreciated that for the sake of clarity additional IOSF-based components may be present within both the device 400 and trust domain 450, but not separately depicted within the context of FIG. 4.

In operation, various types of signals and information (e.g., metadata) are provided to TDCB 410 via the IOSF bus 455 and incoming logical data path 452 as a result of operations performed by the particular circuitry components depicted within IOSF trust domain 450 (e.g., OCP-based ICs 464 and 466 and PCIe-based ICs/peripherals 482, 484 and 486. Such signals and information may be collectively referred to herein as IOSF inter-domain data, and may be collected and interpreted by the TDCB 410 using translation logic 415 for each transaction coming "upstream" towards circuitry components of the TrustZone trust domain 420. The IOSF inter-domain data may include address, cycle type, virtual channel designation, source ID, PCI_BDF data, one or more Security Attributes of an Initiator (SAI attributes), transaction type (such as code or data transaction types), transaction direction, and others. Depending on the particular circuitry component and corresponding transaction, a subset or superset of metadata associated with such IOSF inter-domain data may be utilized by the TDCB 410. In certain embodiments, one or more of a finite state machine, a fixed lookup table, and a programmable lookup table may be included within translation logic 415 for purposes of translating the TrustZone inter-domain data corresponding to each of one or more downstream transactions. In addition, one or more such lookup tables (fixed or programmable) may be included within translation logic 415 and applied for area optimization in order to provide a common subset of associated metadata, such as with respect to one or both of "upstream" and "downstream" transactions. Responsive to the collection and interpretation of the IOSF inter-domain data received by the TDCB 410 via incoming logical data path 452, the TDCB 410 generates a set of TrustZone-compliant metadata corresponding to each upstream transaction and provides the generated metadata to AMBA/AXI bus 425 via outgoing logical data path 422. Non-exclusive examples of such metadata may include non-secure signaling bits (NS bits), one or more modified addresses derived from the incoming IOSF inter-domain data, one or more derived identifications associated with the upstream transaction (e.g., ASID), and one or more control signals corresponding to the upstream transaction.

Also in operation, and in a manner similar to that described above with respect to operations performed by the particular circuitry components depicted within IOSF trust domain 450, various types of signals and information (e.g., metadata) are provided to TDCB 410 via AMBA/AXI bus 425 and incoming logical data path 424 as a result of operations performed by the particular circuitry components depicted within TrustZone trust domain 420 (e.g., ARM-based ICs 431 and 432, ARM-based APB 435, and TZ_ASC 440). Such signals and information may be collectively referred to herein as TrustZone inter-domain data, and may be collected and interpreted by the TDCB 410 using translation logic 415 for each transaction coming "downstream" towards circuitry components of the IOSF trust domain 450. The TrustZone inter-domain data may include address, cycle type, NS bits, IDs (e.g., fabric IDs such as ASID, SSID, SCID, etc.), and others. Depending on the particular circuitry component and corresponding transaction, a subset or superset of metadata associated with such IOSF inter-domain data may be utilized by the TDCB 410. In certain embodiments, one or more of a finite state machine, a fixed lookup table, and a programmable lookup table may be included within translation logic 415 for purposes of translating the TrustZone inter-domain data corresponding to each of one or more downstream transactions. Responsive to the collection and interpretation of the TrustZone inter-domain data received by the TDCB 410 via incoming logical data path 424, the TDCB 410 generates a set of TrustZone-compliant metadata corresponding to each downstream transaction and provides the generated metadata to IOSF bus 455 via outgoing logical data path 454. Non-exclusive examples of such metadata corresponding to the downstream transaction may include a Cycle Type (e.g., I/O, FIO, configuration, memory, etc.), one or more addresses, one or more identification identifiers (IDs), and one or more SAIs or other security attributes. In certain embodiments, additional information corresponding to a programmable state may be utilized in order to distinguish between machine states (e.g., pre-boot, boot, post-boot), which correspond to additional relevant metadata in the IOSF trust domain 450.

Figure 5:
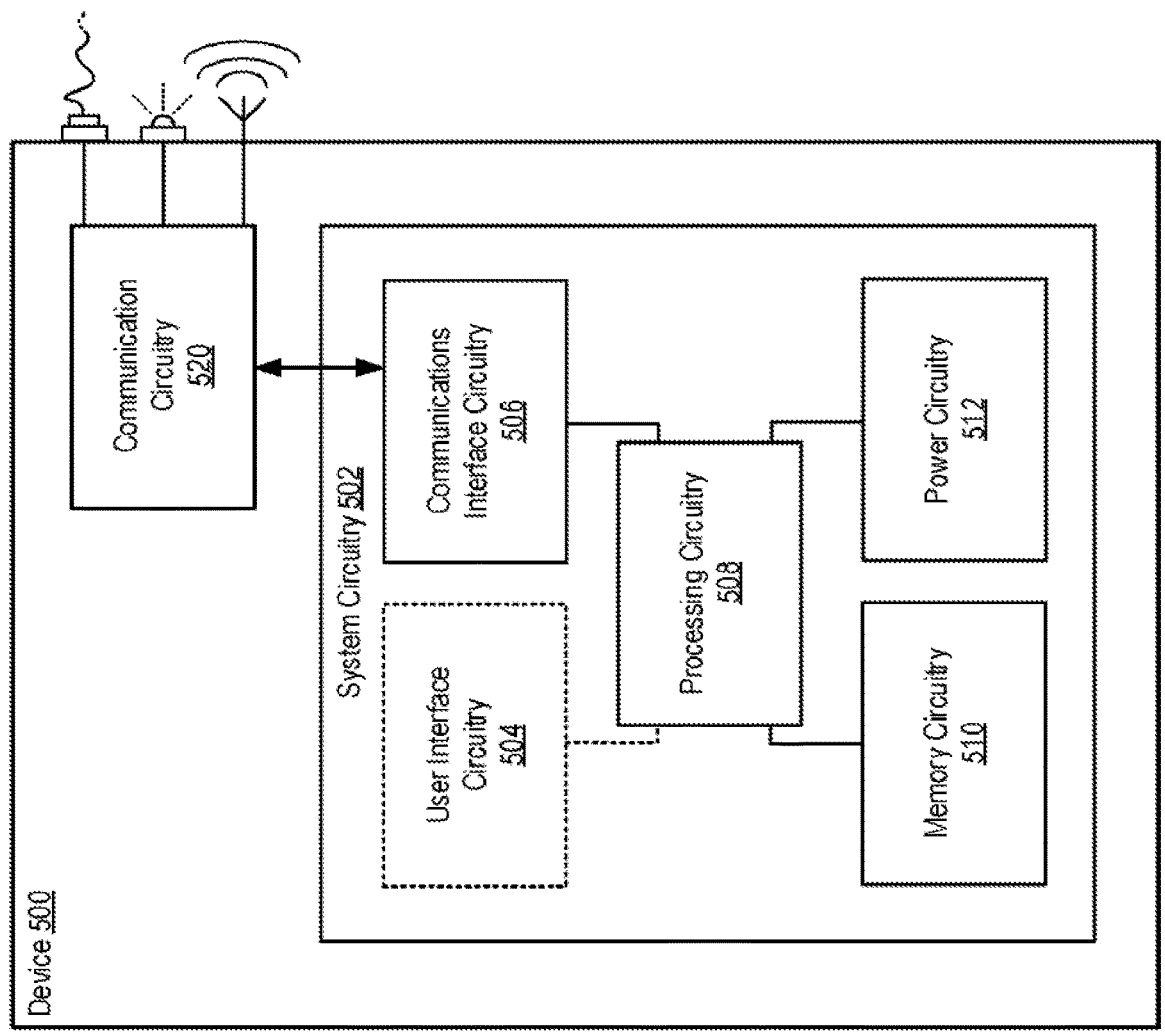
FIG. 5 illustrates an exemplary configuration for a device usable in accordance with at least one embodiment of the present disclosure.

FIG. 5 illustrates an exemplary configuration for a device usable in accordance with at least one embodiment of the present disclosure. Device 500 may be capable of performing any or all of the activities discussed above with respect to FIGS. 1-4. However, device 500 is presented only as an example of an apparatus usable in various embodiments consistent with the present disclosure, and is not intended to limit any of the various embodiments to any particular manner of configuration, implementation, etc.

Device 500 may comprise at least system circuitry 502 to manage device operation. System circuitry 502 may include, for example, processing circuitry 508, memory circuitry 510, power circuitry 512, user interface circuitry 504 and communications interface circuitry 506. Device 500 may further include communication circuitry 520. While communication circuitry 520 is shown as separate from system circuitry 502, the example configuration of device 500 has been provided herein merely for the sake of explanation. Some or all of the functionality associated with communication circuitry 520 may also be incorporated into system circuitry 502.

In device 500, processing circuitry 508 may comprise one or more processors (e.g., one or more host processors) situated in separate components, or alternatively one or more processing cores (e.g., one or more host processing cores) situated in one component (e.g., in an SoC), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors or any other evolution of computing paradigm or physical implementation of such integrated circuits (ICs), etc. Examples of support circuitry may include chipsets (e.g., Northbridge, Southbridge, etc. available from the Intel Corporation) configured to provide an interface via which communication circuitry 520 may interact with other system components that may be operating at different speeds, on different buses, etc. in device 500. Moreover, some or all of the functionality commonly associated with the support circuitry may also be included in the same physical package as the processor (e.g., such as in the Sandy Bridge family of processors available from the Intel Corporation).

Processing circuitry 508 may be configured to execute various instructions in device 500. Instructions may include program code and/or microcode configured to cause processing circuitry 508 to perform activities related to reading data, writing data, processing data, formulating data, converting data, transforming data, etc. Information (e.g., instructions, data, etc.) may be stored in memory circuitry 510. Memory circuitry 510 may comprise random access memory (RAM) and/or read-only memory (ROM) in a fixed or removable format. RAM may include volatile memory configured to hold information during the operation of device 500 such as, for example, static RAM (SRAM) or Dynamic RAM (DRAM). ROM may include non-volatile (NV) memory circuitry configured based on BIOS, UEFI, etc. to provide instructions when device 500 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 512 may include internal power sources (e.g., a battery, fuel cell, etc.) and/or external power sources (e.g., electromechanical or solar generator, power grid, external fuel cell, etc.), and related circuitry configured to supply device 500 with the power needed to operate. User interface circuitry 504 may include hardware and/or software to allow users to interact with device 500 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 504 may be incorporated within device 500 and/or may be coupled to device 500 via a wired or wireless communication medium. In an exemplary implementation wherein device 500 is a multiple device system, user interface circuitry 504 may be optional in devices such as, for example, servers (e.g., rack/blade servers, etc.) that omit user interface circuitry 504 and instead rely on another device (e.g., an operator terminal) for user interface functionality.

Communications interface circuitry 506 may be configured to manage packet routing and other functionality for communication circuitry 520, which may include resources configured to support wired and/or wireless communications. In some instances, device 500 may comprise more than one set of communication circuitry 520 (e.g., including separate physical interface circuitry for wired protocols and/or wireless radios) managed by communications interface circuitry 506. Wired communications may include serial and parallel wired or optical mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, etc.), long range wireless mediums (e.g., cellular wide-area radio communication technology, satellite-based communications, etc.), electronic communications via sound waves, lasers, etc. In one embodiment, communications interface circuitry 506 may be configured to prevent wireless communications that are active in communication circuitry 520 from interfering with each other. In performing this function, communications interface circuitry 506 may schedule activities for communication circuitry 520 based on, for example, the relative priority of messages awaiting transmission. While the embodiment disclosed in FIG. 5 illustrates communications interface circuitry 506 being separate from communication circuitry 520, it may also be possible for the functionality of communications interface circuitry 506 and communication circuitry 520 to be incorporated into the same circuitry.

Consistent with the present disclosure, the circuitry identified as processing circuitry 508 and memory circuitry 510 may comprise hardware configured to transport and process data, including but not limited to memory map data, configuration register data, and other data. "Hardware" as referenced herein, may include, for example, discrete analog and/or digital components (e.g., arranged on a printed circuit board (PCB) to form circuitry), at least one integrated circuit (IC), at least one group or set of ICs that may be configured to operate cooperatively (e.g., chipset), a group of IC functionality fabricated on one substrate (SoC), or combinations thereof. In certain embodiments, portions of processing circuitry 508 may comprise a portion of memory circuitry 510, or vice versa. In at least one example embodiment, portions of the components identified as system circuitry 502 may be composed of software (e.g., instructions, data, etc.) that, when loaded into RAM in memory circuitry 510, may cause processing circuitry 508 to transform from general purpose processing circuitry into specialized circuitry configured to perform certain functions based on such software.

While FIGS. 1-5 of the present disclosure illustrate and/or describe operations according to particular embodiments in accordance with techniques described herein, it is to be understood that not all such operations are necessary for other embodiments. Indeed, it is fully contemplated herein that in other embodiments of the present disclosure, the operations illustrated and/or described with respect to FIGS. 1-5, and/or other operations described herein, may be combined in a manner not specifically shown in any of those drawings, but still fully consistent with the present disclosure. Thus, claims directed to features and/or operations that are not exactly shown in one drawing are deemed within the scope and content of the present disclosure.

In general, an IC- or SoC-based device described herein may comprise various physical and/or logical components for communicating information which may be implemented as hardware, software, or any combination thereof, as desired for a given set of design parameters or performance constraints. Although the accompanying figures and corresponding text may depict or describe a limited number of components by way of example, it will be appreciated that a greater or a fewer number of components may be employed for a given implementation.

In various embodiments, an IC- or SoC-based device described herein described herein may be implemented for a PC, CE, and/or mobile platform as a system within and/or connected to a device such as personal computer (PC), set-top box (STB), television (TV) device, Internet Protocol TV (IPTV) device, media player, and/or smart phone. Other examples of such devices may include, without limitation, a workstation, terminal, server, media appliance, audio/video (A/V) receiver, digital music player, entertainment system; digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a digital camera, a gaming console, display device, notebook PC, a laptop computer, portable computer, handheld computer, personal digital assistant (PDA), voice over IP (VoIP) device, cellular telephone, combination cellular telephone/PDA, pager, messaging device, wireless access point (AP), wireless client device, wireless station (STA), base station (BS), subscriber station (SS), mobile subscriber center (MSC), mobile unit, and so forth.

In various embodiments, an IC- or SoC-based device described herein may form part of a wired communications system, a wireless communications system, or a combination of both. For example, such a device may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Such a device also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, an IC- or SoC-based device described herein may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system," "component," or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, used in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical discs, compact disc read-only memories (CD-ROMs), compact disc rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to providing consistent memory operations and security across electronic circuitry components having disparate memory and/or security architectures when integrating such disparately architected components within a single system, such as a system on chip. Isolated memory region (IMR) enforcement circuits may be provided to protect isolated memory regions by allowing or preventing memory access requests from one of multiple distinct circuitry components based on values stored within configuration registers for the IMR enforcement circuits that specify memory address ranges and source permissions. Integration of multiple trust domain architectures associated with the multiple distinct circuitry components is facilitated via trust domain conversion bridge circuitry that includes translation logic for generating information in accordance with a first trust domain architecture based on information provided in accordance with a distinct second trust domain architecture The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for secure display of protected content.

According to example 1 there is provided a system for protection of one or more isolated memory regions. The system may comprise one or more processors. The system may further comprise a system memory coupled to the one or more processors that includes a quantity of isolated memory regions (IMRs). The system may further comprise one or more isolated memory region (IMR) enforcement circuits. The IMR enforcement circuit may be to determine, responsive to a memory access request from a requesting one of multiple distinct circuitry components coupled to the system memory, whether a target address specified by the memory access request satisfies a defined address range associated with the IMR enforcement circuit. The IMR enforcement circuit may further be to determine, based at least in part on one or more permission registers of the IMR enforcement circuit, whether the requesting one circuitry component is allowed to access the specified target address in a manner indicated by the memory access request. The IMR enforcement circuit may further be to, responsive to a determination that the specified target address satisfies the defined address range and that the requesting one circuitry component is allowed to access the specified target address in the indicated manner, forward the memory access request for performance, and otherwise prevent the memory access request.

Example 2 may include the elements of example 1, wherein one of the one or more IMR enforcement circuits includes configuration registers to store one or more memory addresses that define the address range associated with the one IMR enforcement circuit.

Example 3 may include the elements of any of examples 1 to 2, wherein the one or more memory addresses that define the address range associated with the one IMR enforcement circuit are stored in the configuration registers during initialization of the system.

Example 4 may include the elements of example 3 and may further comprise an operating system, wherein the one or more memory addresses that define the address range associated with the one IMR enforcement circuit are stored in the configuration registers prior to execution of the operating system by the one or more processors.

Example 5 may include the elements of example 4, wherein memory addresses corresponding to the quantity of IMRs are unavailable for use by the operating system.

Example 6 may include the elements of any of examples 1 to 5, wherein the one or more permission registers of the IMR enforcement circuit store an identifier for each of one or more of the multiple distinct circuitry components that are allowed to access addresses within the defined address range associated with the IMR enforcement circuit.

Example 7 may include the elements of any of examples 1 to 6, wherein the system memory includes a flexible memory map, wherein the requesting one circuitry component is associated with a first fixed memory map, and wherein at least one of the one or more IMR enforcement circuits is further to cause the flexible memory map to emulate the first fixed memory map associated with the requesting one circuitry component.

Example 8 may include the elements of example 7, wherein an additional distinct circuitry component of the multiple distinct circuitry components is associated with a distinct second fixed memory map, and wherein the one or more IMR enforcement circuits are further to cause the flexible memory map to emulate the distinct second fixed memory map associated with the additional distinct circuitry component.

Example 9 may include the elements of any of examples 1 to 8, wherein the quantity of IMRs includes a first quantity of IMRs available for use of the requesting one circuitry component, wherein the requesting one circuitry component is designed to utilize a distinct second quantity of IMRs that is greater than the first quantity, and wherein the one or more IMR enforcement circuits are configured to emulate the distinct second quantity of IMRs for use by the requesting one circuitry component.

Example 10 may include the elements of any of examples 1 to 9, wherein to prevent the memory access request includes to cause the system to generate one or more error messages in response to the memory access request.

Example 11 may include the elements of any of examples 1 to 10, wherein the system further comprises one or more subsystems that each includes one of the one or more IMR enforcement circuits and a defined trusted computing boundary.

Example 12 may include the elements of any of examples 1 to 11, wherein the system further comprises one or more subsystems that each includes one of the one or more IMR enforcement circuits and a defined memory map.

According to example 13 there is provided circuitry for enforcing protected use of one or more isolated memory regions (IMRs). The circuitry may comprise one or more isolated memory region (IMR) enforcement circuits. The IMR enforcement circuit may be to determine, responsive to a memory access request from a requesting one of multiple distinct circuitry components coupled to the one or more IMRs, whether a target address specified by the memory access request satisfies a defined address range associated with the IMR enforcement circuit. The IMR enforcement circuit may further be to determine, based at least in part on one or more permission registers of the IMR enforcement circuit, whether the requesting one circuitry component is allowed to access the specified target address in a manner indicated by the memory access request. The IMR enforcement circuit may further be to, responsive to a determination that the specified target address satisfies the defined address range and that the requesting one circuitry component is allowed to access the specified target address in the indicated manner, forward the memory access request for performance, and otherwise prevent the memory access request.

Example 14 may include the elements of example 13, wherein one of the one or more IMR enforcement circuits includes configuration registers to store one or more memory addresses that define the address range associated with the one IMR enforcement circuit.

Example 15 may include the elements of example 14, wherein the one or more memory addresses that define the address range associated with the one IMR enforcement circuit are stored in the configuration registers during initialization of a system that includes the one IMR enforcement circuit.

Example 16 may include the elements of any of examples 14 to 15, wherein the one or more memory addresses that define the address range associated with the one IMR enforcement circuit are stored in the configuration registers prior to execution of an operating system of a system that includes the one IMR enforcement circuit.

Example 17 may include the elements of any of examples 14 to 16, wherein memory addresses corresponding to the one or more IMRs are unavailable for use by the operating system.

Example 18 may include the elements of any of examples 13 to 17, wherein the one or more permission registers of the IMR enforcement circuit store an identifier for each of at least one of the multiple distinct circuitry components that are allowed to access addresses within the defined address range associated with the IMR enforcement circuit.

Example 19 may include the elements of any of examples 13 to 18, wherein the one or more IMRs are assigned for use in accordance with a flexible memory map, wherein the requesting one circuitry component is associated with a first fixed memory map, and wherein at least one of the one or more IMR enforcement circuits is further to cause the flexible memory map to emulate the first fixed memory map associated with the requesting one circuitry component.

Example 20 may include the elements of example 19, wherein an additional distinct circuitry component of the multiple distinct circuitry components is associated with a distinct second fixed memory map, and wherein the one or more IMR enforcement circuits are further to cause the flexible memory map to emulate the distinct second fixed memory map associated with the additional distinct circuitry component.

Example 21 may include the elements of any of examples 13 to 20, wherein the one or more IMRs include a first quantity of IMRs available for use of the requesting one circuitry component, wherein the requesting one circuitry component is designed to utilize a distinct second quantity of IMRs that is greater than the first quantity, and wherein the one or more IMR enforcement circuits are configured to emulate the distinct second quantity of IMRs for use by the requesting one circuitry component.

According to example 22, a system is provided for integrating multiple circuitry components that are based on multiple trust domain architectures. The system may comprise one or more circuitry components that in operation utilize a first trust domain architecture. The system may further comprise one or more circuitry components that in operation utilize a distinct second trust domain architecture. The system may further comprise trust domain bridge circuitry coupled to each of at least one of the one or more first circuitry components and to each of at least one of the one or more second circuitry components. The trust domain conversion bridge circuitry may be to receive trust domain information from the one or more first circuitry components, the received trust domain information being compliant with the first trust domain architecture and corresponding to a transaction between at least one of the one or more first circuitry components and at least one of the one or more second circuitry components. The trust domain conversion bridge circuitry may further be to, responsive to receiving the first trust domain information from the one or more first circuitry components, generate distinct second trust domain information that is in accordance with the second trust domain architecture and corresponds to the transaction between the at least one first circuitry component and the at least one second circuitry component. The trust domain conversion bridge circuitry may further be to provide the generated distinct second trust domain information to the at least one second circuitry component.

Example 23 may include the elements of example 22, wherein the first trust domain architecture is based on an I/O Scalable Fabric bus architecture.

Example 24 may include the elements of any of examples 22 to 23, wherein the second trust domain architecture is based on an ARM-based bus architecture.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A trust domain conversion bridge including:
   inputs;
   outputs;
   trust domain bridge circuitry coupled, by way of at least one of the inputs to one or more first circuitry components that, in operation, utilize a first trust domain architecture corresponding to first security information, and further coupled, by way of at least one of the outputs, to one or more second circuitry components that, in operation, utilize a second trust domain architecture corresponding to second security information different from the first security information, and wherein the trust domain bridge circuitry is to:
   receive first trust domain information from at least one of the one or more first circuitry components through the at least one of the inputs, wherein the first trust domain information includes an address and a cycle type, the first trust domain information being compliant with the first trust domain architecture and corresponding to a transaction between said at least one of the one or more first circuitry components and at least one of the one or more second circuitry components;
   generate, based on the first trust information, second trust domain information that is in accordance with the second trust domain architecture and corresponds to the transaction between the at least one of the one or more first circuitry components and the at least one of the one or more second circuitry components; and
   provide the second trust domain information to the at least one of the one or more second circuitry components through the at least one of the outputs.

2. The trust domain bridge of claim 1, wherein the trust domain bridge circuitry is to generate the second trust domain information by using one or more of a finite state machine, a fixed lookup table, or a programmable lookup table.

3. The trust domain bridge of claim 1, wherein the trust domain bridge circuitry is to use configurable parameters to compensate for one or more machine states not specific to any one trust domain, the one or more machine states including at least one of a debug state, a pre-boot state, a boot state or an operating system (OS) specified state.

4. The trust domain bridge of claim 1, wherein the first trust domain information includes at least one of NS bits or an identification (ID).

5. The trust domain bridge of claim 4, wherein the ID includes one or more of fabric IDs.

6. The trust domain bridge of claim 1, wherein the second trust domain information includes at least one of a Cycle Type, an address, an identification (ID), or a Security Attributes Initiator.

7. The trust domain bridge of claim 6, wherein the second trust domain information further includes a programmable state to distinguish between a pre-boot, boot and post-boot machine state.

8. The trust domain bridge of claim 1, wherein the first trust domain architecture is based on an a flexible memory map with target-based protections for at least one of memory or memory-mapped input/output.

9. The trust domain bridge of claim 1, wherein the second trust domain architecture is based on a fixed memory map security model for memory-based protection.

10. A system for integrating multiple circuitry components that are based on multiple trust domain architectures, the system comprising:
one or more first circuitry components that in operation utilize a first trust domain architecture corresponding to first security information;
one or more second circuitry components that in operation utilize a second trust domain architecture corresponding to second security information different from the first security information;
trust domain bridge circuitry coupled to each of at least one of the one or more first circuitry components and to each of at least one of the one or more second circuitry components, wherein the trust domain bridge circuitry is to:
receive first trust domain information from at least one of the one or more first circuitry components, wherein the first trust domain information includes an address and a cycle type, the first trust domain information being compliant with the first trust domain architecture and corresponding to a transaction between said at least one of the one or more first circuitry components and at least one of the one or more second circuitry components;
generate, based on the first trust domain information, second trust domain information that is in accordance with the second trust domain architecture and corresponds to the transaction between the at least one of the one or more first circuitry components and the at least one of the one or more second circuitry components; and
provide the generated second trust domain information to the at least one of the one or more second circuitry components.

11. The system of claim 10, wherein generating second trust domain information includes using one or more of a finite state machine, a fixed lookup table, or a programmable lookup table.

12. The system of claim 10, further including using configurable parameters of the trust domain bridge circuitry to compensate for one or more machine states not specific to any one trust domain, the one or more machine states including at least one of a debug state, a pre-boot state, a boot state or an operating system (OS) specified state.

13. The system of claim 10, wherein the first trust domain information includes at least one of an address, a cycle type, NS bits, an identification (ID).

14. A method to be performed at a trust domain bridge circuitry (TDBC) that is connected to each of one or more first circuitry components that in operation utilize a first trust domain architecture corresponding to first security information, and that is connected to each of one or more second circuitry components that in operation utilize a second trust domain architecture corresponding to a second security information different from the first security information, the method including:
receiving first trust domain information from at least one of the one or more first circuitry components, wherein the first trust domain information includes an address and a cycle type, the first trust domain information being compliant with the first trust domain architecture and corresponding to a transaction between said at least one of the one or more first circuitry components and at least one of the one or more second circuitry components;
generate, based on the first trust domain information, second trust domain information that is in accordance with the second trust domain architecture and corresponds to the transaction between the at least one of the one or more first circuitry components and the at least one of the one or more second circuitry components; and
provide the generated second trust domain information to the at least one of the one or more second circuitry components.

15. The method of claim 14, wherein generating second trust domain information includes using one or more of a finite state machine, a fixed lookup table, or a programmable lookup table.

16. The method of claim 14, further including using configurable parameters of the trust domain bridge circuitry to compensate for one or more machine states not specific to any one trust domain, the one or more machine states including at least one of a debug state, a pre-boot state, a boot state or an operating system (OS) specified state.

17. The method of claim 14, wherein the first trust domain information includes at least one of an address, a cycle type, NS bits, an identification (ID).

18. The method of claim 17, wherein the ID includes one or more of fabric IDs.

19. The method of claim 14, wherein the second trust domain information includes at least one of a Cycle Type, an address, an identification (ID), or a Security Attributes Initiator.

20. The method of claim 19, wherein the second trust domain information further includes a programmable state to distinguish between a pre-boot, boot and post-boot machine state.

21. A non-transitory machine readable storage medium to store instructions that, when executed, cause a trust domain bridge circuitry (TDBC) that is connected to each of one or more first circuitry components that in operation utilize a first trust domain architecture corresponding to first security information, and that is connected to each of one or more second circuitry components that in operation utilize a second trust domain architecture corresponding to second security information different from the security information, to perform operations including:
receive first trust domain information from at least one of the one or more first circuitry components, wherein the first trust domain information includes an address and a cycle type, the first trust domain information being compliant with the first trust domain architecture and corresponding to a transaction between said at least one of the one or more first circuitry components and at least one of the one or more second circuitry components;

generate, based on the first distinct second trust domain information that is in accordance with the second trust domain architecture and corresponds to the transaction between the at least one of the one or more first circuitry components and the at least one of the one or more second circuitry components; and provide the generated distinct second trust domain information to the at least one of the one or more second circuitry components.

22. The storage medium of claim 21, wherein generating second trust domain information includes using one or more of a finite state machine, a fixed lookup table, or a programmable lookup table.

23. The storage medium of claim 21, further including using configurable parameters of the trust domain bridge circuitry to compensate for one or more machine states not specific to any one trust domain, the one or more machine states including at least one of a debug state, a pre-boot state, a boot state or an operating system (OS) specified state.

24. The storage medium of claim 21, wherein the first trust domain information includes at least one of NS bits or an identification (ID).

25. The method of claim 24, wherein the ID includes one or more of fabric IDs.

* * * * *